United States Patent [19]
Baker et al.

[11] Patent Number: 5,418,468
[45] Date of Patent: May 23, 1995

[54] APPARATUS FOR DETERMINING THE POSITION AND VELOCITY OF A MOVING OBJECT

[75] Inventors: Thomas M. Baker, Peoria, Ill.; George Codina, North Hollywood, Calif.; John F. Szentes, Peoria, Ill.

[73] Assignee: Caterpillar Inc., Peoria, Ill.

[21] Appl. No.: 83,414

[22] Filed: Jun. 28, 1993

[51] Int. Cl.⁶ ............................................. G01R 27/26
[52] U.S. Cl. .................................... 324/674; 324/663; 324/681; 324/686
[58] Field of Search ............... 324/658, 663, 671, 674, 324/681, 686, 690

[56] References Cited

U.S. PATENT DOCUMENTS

| | | | |
|---|---|---|---|
| 4,259,637 | 3/1981 | Bloomfield et al. | 324/166 |
| 4,386,312 | 5/1983 | Briefer | 324/60 C |
| 4,794,321 | 12/1988 | Dotsko | 324/61 P |
| 4,862,063 | 8/1989 | Kobayashi et al. | 324/690 |
| 4,864,295 | 9/1989 | Rohr | 324/663 X |
| 4,961,055 | 10/1990 | Habib et al. | 324/690 X |
| 5,040,272 | 8/1991 | Fritzsche | 19/104 |

OTHER PUBLICATIONS

"Handbook of Transducers for Electronic Measuring Systems", Harry N. Norton, pp. 168–169, Copyright 1969.

"Linear Displacement Measurement Circuit", Lewis D. Meixler, Jan. 1990.

*Primary Examiner*—Kenneth A. Wieder
*Assistant Examiner*—Glenn W. Brown
*Attorney, Agent, or Firm*—David M. Materson

[57] ABSTRACT

An apparatus for determining the position of a movable object is disclosed. A pair of fixed elements having spaced electrically conductive surfaces form a capacitor. A movable element having an electrically nonconductive composition is connected to the movable object. The movable element is disposed between the fixed element pair. In response to the movement of the movable element, the capacitance value of the variable capacitor changes. A circuit detects the change in capacitance and determines the relative position of the movable object.

7 Claims, 3 Drawing Sheets

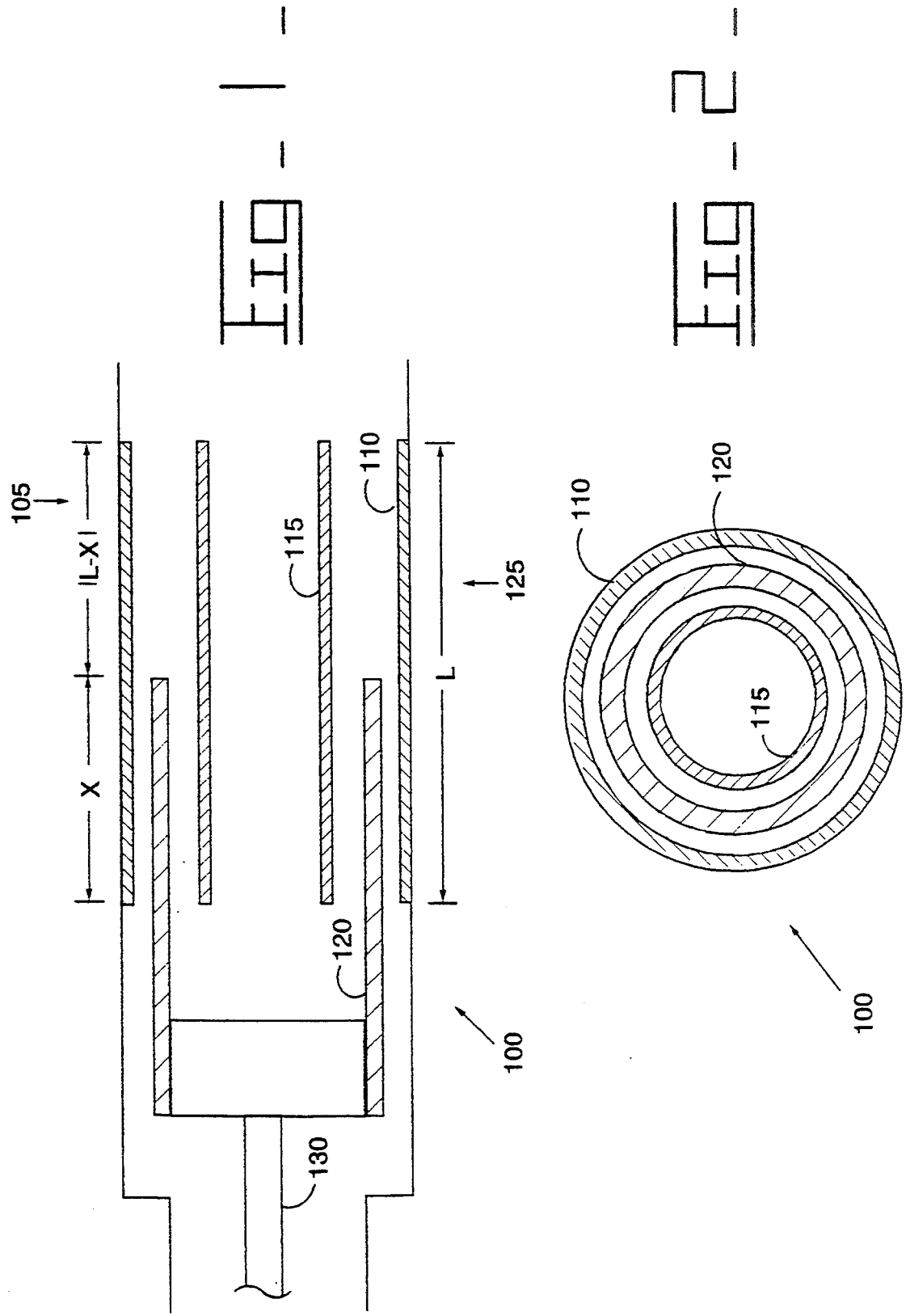

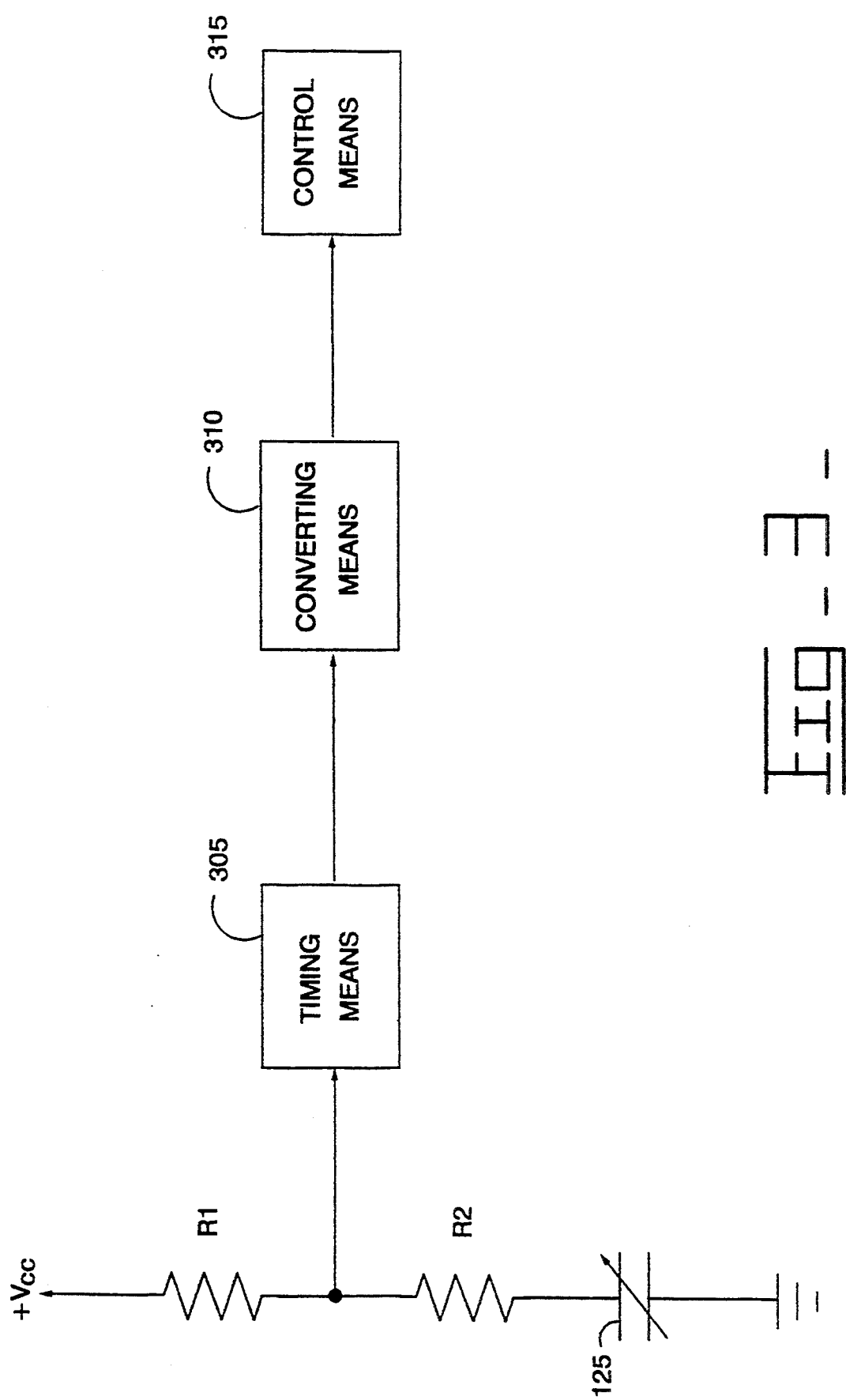

APPARATUS FOR DETERMINING THE POSITION AND VELOCITY OF A MOVING OBJECT

TECHNICAL FIELD

This invention relates generally to apparatus for determining the position of a moving object and, more particularly, to an apparatus for determining the position of a moving object using capacitive sensing.

BACKGROUND ART

Sensors are used to provide positional information for use by servomechanisms. Servomechanisms are used in a plurality of control systems that utilize feedback control. Such sensors comprise various technologies, including: optical, inductive, mechanical, acoustic, or capacitive-type technologies. However many of these sensor technologies cannot survive in the harsh environments typically exposed to work vehicles, e.g. extreme temperature, humidity, dust, oil, moisture, vibration, shock, etc.

One example of a servomechanisms for a work vehicle is an electrohydraulic valve system. Electrohydraulic valve systems provide the muscle for high-force applications. An electromechanical actuator provides the necessary linear or rotary motion to displace the spool of an hydraulic valve to a desired position. Typically a position sensor measures the position of the actuator armature to achieve feedback control.

The most common method of determining the position of the armature is to connect an external sensor to the actuator. Such sensors often take the form of linear voltage differential transformers (LVDT). While the addition of the LVDT provides the desired information, the excessive cost of the sensor due to the associated complex electronic circuitry and EMI shielding requirements make the LVDT undesirable.

Due to the inherent simplicity of capacitive technology, it may be desirable to use such technology in work vehicle applications. Capacitive technology includes the advantages of a non-contacting sensor design that lends to long term reliability. Additionally, capacitive technology can be used in an hydraulic environment to which the entire sensor can be fully immersed in hydraulic fluid and still provide good accuracy.

However existing capacitive sensor technology has several drawbacks. For example, such capacitive sensors utilize moving electrically conductive elements to give positional information. Unfortunately the moving elements tend to cause poor sensor reliability because the movement weakens the electrical connections. Further the moving elements also introduce unwanted "noise" to the control system. Other sources of problems with existing capacitive sensor technology include the addition of circuitry to deliver an "input" signal to the capacitive elements, and circuitry to condition the "output" signal. The additional circuitry adds excessive cost and complexity to the sensor.

The present invention is directed to overcoming one or more of the problems as set forth above.

DISCLOSURE OF THE INVENTION

In one aspect of the present invention an apparatus for determining the position of a movable object is disclosed. A pair of fixed elements having spaced electrically conductive surfaces form a capacitor. A movable element having an electrically nonconductive composition is connected to the movable object. The movable element is disposed between the fixed element pair. In response to the movement of the movable element, the capacitance value of the variable capacitor changes. A circuit detects the change in capacitance and determines the relative position of the movable element.

BRIEF DESCRIPTION OF THE DRAWINGS

For a better understanding of the present invention, reference may be made to the accompanying drawings in which:

FIG. 1 shows a longitudinal cross sectional view of a preferred embodiment of the present invention;

FIG. 2 shows a latitudinal cross sectional view of a preferred embodiment of the present invention;

FIG. 3 shows a block diagram of the electronic circuitry associated with the present invention.

BEST MODE FOR CARRYING OUT THE INVENTION

Figure 4:
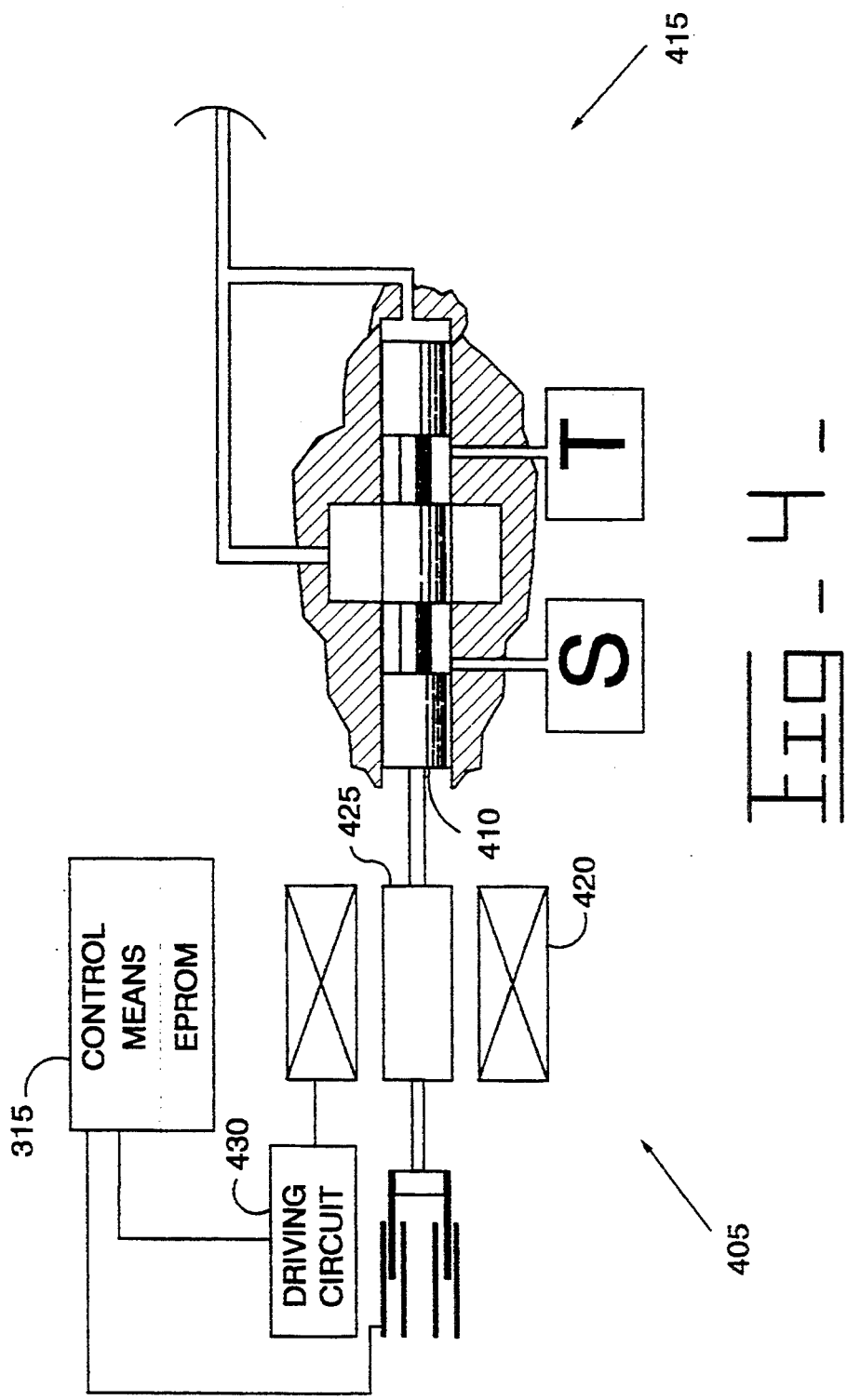
FIG. 4 shows one application of the present invention in relation to a electrohydraulic valve.

The present invention is particularly suited for determining the position and velocity of a moving object. For example FIG. 1 is a cross sectional view of the preferred embodiment of the present invention. As shown the present invention 100 includes a pair of fixed elements 105 that have electrically conductive surfaces 110,115. The electrically conductive surfaces 110,115 are spaced apart and are parallel to one another. One of the surfaces 110 receives electrical energy of one polarity, while the other surface 115 receives electrical energy of a second polarity. A movable element 120, which is composed of an electrically nonconductive material, is disposed between the fixed element pair 105. Preferably the movable element 120 is composed of a dielectric material having a higher dielectric value than that of the medium surrounding the elements 105,120, e.g. air or hydraulic fluid. Advantageously the fixed element pair 105 and movable element 120 form a variable capacitor 125, where the movement of the movable element 120 relative to the fixed element pair 105 varies the effective capacitance of the variable capacitor 125. A coupling shaft 130 connects the movable element 120 to the moving object to provide the necessary movement of the movable element 120.

In the preferred embodiment, the fixed element pair 105 and movable element 120 each are of a cylindrical shape, which is aptly illustrated by FIG. 2. Although a cylindrical configuration is shown, the present invention is not limited to the illustrated geometrical shape as a myriad of other geometrical shapes may be apparent to those skilled in the art. For example, the variable capacitor 125 may instead consist of planar elements. However, the illustrated configuration is chosen because the design achieves a high capacitance value per unit area and is desirable for a particular application to be discussed infra.

The relationship between the capacitance of the variable capacitor 125 and the relative position of the moving element 120 to the fixed element pair 105 is now discussed. The total capacitance, $C_{tot}$, of the variable capacitor 125 is shown by the following equation:

$$C_{tot} = (C_m * X) + (C_s * (L-X)) \qquad \text{Eq. 1}$$

where the quantity ($C_m * X$) corresponds to the capacitance value associated with the moving element 120 and the quantity ($C_s * (L-X)$) corresponds to the capacitance value associated with the medium occupying the space between the fixed elements, e.g. air or hydraulic fluid.

Eq. 1, however, may be simplified by the following relationship:

$$C_{tot} = a*X \qquad \text{Eq. 2}$$

where, a, is the linear coefficient that is associated with the dielectric material of the moving element 120 and X represents the amount of displacement of the moving element 120.

Although the above equation does not directly compensate for temperature variations of the variable capacitor 125, those skilled in the art may readily make the necessary adjustments since the capacitance value may change in response to varying temperatures.

A block diagram of the electronic circuitry that is associated with the present invention is now shown with reference to FIG. 3. A timing means 305 produces a frequency modulated position signal in response to capacitance value of the variable capacitor 125. Preferably, the timing means 305 is a circuit manufactured by National Semiconductor as part no. LM 555. The period, T, of the position signal is related to the capacitance value, $C_{tot}$, of the variable capacitor 125 by the following equation:

$$T = (0.693 * (R1+R2)) * C_t = b * C_{tot} \qquad \text{Eq. 3}$$

substituting $C_{tot}$ in Eq. 2, Eq. 3 becomes $$T = b * (a*X) \qquad \text{Eq. 4}$$

since the constants, a,b, are known values the period, T, represents the relative position of the movable element, X.

A converting means 310 receives the frequency modulated position signal and transforms the position signal into pulse width modulated (PWM) form. The PWM position signal is then delivered to a control means 315.

Preferably the control means 315 is a microprocessor based circuit that employs either a look-up table or an empirical equation to determine the position of the movable element 120. Thus, the control means 315 may include an EPROM to store empirically determined data that relates a plurality of position signal magnitudes to a plurality of displacement values. For example, the control means 315 receives the PWM position signal and retrieves the stored characteristics from the EPROM and compares the characteristics to the representative signal to determine the position of the moving element 120 with respect to the fixed element pair 105. A two-dimensional look-up table of a type well-known in the art may be used to complete the comparison and select the value. The number of characteristics stored in memory is dependent upon the desired resolution of the system. Interpolation may be used to determine the actual value in the event that the measured and calculated values fall between the discrete values stored in memory.

Once the positional information is determined, the control means 315 may then determine the velocity of the moving element 120 via differentiation techniques that are well known in the art.

The block diagram of FIG. 3 depicts a complete working model of the present invention. The specific circuit configuration to carry-out the invention is a matter of design choice and is not critical to the present invention.

INDUSTRIAL APPLICABILITY

The operation of the present invention is best described in relation to its use in relation to work vehicles. For example reference is now made to FIG. 4, where an electrohydraulic valve system is shown. Although the present invention is described in relation to an electrohydraulic valve system, it is understood that the present invention may be used in a variety of other work vehicle applications where positional and velocity information is desired.

As shown, an electromagnetic actuator 405 is used to position a spool 410 of an hydraulic valve 415. The electromagnetic actuator 405 includes a coil 420 and an armature 425. A driving circuit 430 delivers electrical energy to the coil, which responsively energizes. The energized coil causes the armature 425 to displace, which positions the spool 410. In the illustrated embodiment the present invention provides positional information to the control means 315, which controls the magnitude of the driving signal to yield the desired spool position.

For example the moving element 120 is connected to the armature 425. As the armature 425 moves so does the movable element 120. The movement of the movable element 120 causes a change in capacitance of the variable capacitor 125. The timing means 305 detects the capacitance value of the variable capacitor 125, and produces a position signal having a period proportional to the capacitance value, which is proportional to the displacement of the moving element 120. The converting means 310 receives the frequency modulated position signal and produces a PWM position signal to the control means 315. The control means 315 performs the necessary comparisons and determines the position of the moving element 120, which is proportional to the position of the spool 410. The control means 315 then controls the driving circuit 430 to deliver the proper driving signal to the coil 420 to achieve the desired spool position.

Thus, the determined position of the moving element 120 usable in connection with a number of control and diagnostic systems. As shown above, the positional information can be used to provide a closed-loop control for a solenoid by providing the controller with an actual position that can be compared with a desired position in order to responsively change the magnitude of the coil current accordingly. Alternatively, the positional information can be used in a diagnostic system to determine whether the device being actuated by the armature is operating properly in response to the desired function being indicated by the control system.

Other aspects, objects and advantages of the present invention can be obtained from a study of the drawings, the disclosure and the appended claims.

We claim:

1. An apparatus for determining the position of a spool of an electrohydraulic valve, comprising:
   an electrohydraulic valve housing;
   an electromagnetic actuator, including:
     a coil;
     means for energizing the coil; and an armature being movable relative to the coil in response to the coil being energized, the armature being rigidly attached to the spool and adapted to position the spool to a plurality of spool positions;

a sensor, including:
- a pair of fixed elements having spaced electrically conductive surfaces, wherein hydraulic fluid flows between the fixed element pair; and
- a movable element being disposed between the fixed element pair and being movable with the spool, the movable element having a dielectric value greater than the dielectric value associated with the hydraulic fluid; and electronic circuitry, including:
- powering means for supplying electrical energy of a first polarity to one of the fixed elements and electrical energy of a second polarity to the other fixed element;
- timing means for producing an actual position signal in response to the movable element moving relative to the fixed element pair; and
- control means for determining the position of the spool with respect to the electrohydraulic valve housing in response to the actual position signal.

2. An apparatus, as set forth in claim 1, wherein the fixed element pair forms a variable capacitor, the capacitance value of which varies as a function of the relative position of the movable element to the fixed element pair.

3. An apparatus, as set forth in claim 2, wherein the movable element includes:
- a cylindrical body; and
- a coupling shaft that rigidly connects the cylindrical body to the armature.

4. An apparatus, as set forth in claim 3, wherein the fixed element pair comprise coaxial cylindrical surfaces, the cylindrical body being disposed between the cylindrical surfaces.

5. An apparatus, as set forth in claim 4, wherein the timing mean includes means for producing a position signal having frequency modulation, the period of the position signal being a function of the capacitance value of the variable capacitor.

6. An apparatus, as set forth in claim 5, including a converting means for receiving the frequency modulated position signal and responsively producing a pulse width modulation position signal.

7. An apparatus, as set forth in claim 6, wherein the control means includes a memory means for storing a plurality of spool positions corresponding to a plurality of actual position signal magnitudes and selecting one of the plurality of stored spool positions in response to the actual position signal magnitude.

* * * * *